(12) United States Patent
Leung (10) Patent No.: US 6,622,275 B2
(45) Date of Patent: Sep. 16, 2003

(54) METHOD AND APPARATUS SUPPORTING TDD/TTY MODULATION OVER VOCODED CHANNELS

(75) Inventor: Nikolai K. N. Leung, Arlington, VA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/152,190

(22) Filed: Sep. 12, 1998

(65) Prior Publication Data

US 2003/0067882 A1 Apr. 10, 2003

(51) Int. Cl.⁷ .............................. G06F 11/00; H04L 1/00
(52) U.S. Cl. ...................................................... 714/747
(58) Field of Search ................................ 370/252, 320; 714/747

(56) References Cited

U.S. PATENT DOCUMENTS

| | | | | |
|---|---|---|---|---|
| 4,901,307 A | | 2/1990 | Gilhousen et al. ............ 370/18 |
| 5,768,291 A | * | 6/1998 | Kelton et al. ................ 714/746 |
| 5,799,039 A | * | 8/1998 | Laird et al. .................. 375/244 |
| 5,907,822 A | * | 5/1999 | Prieto, Jr. .................... 704/202 |
| 5,925,146 A | * | 7/1999 | Murata et al. ............... 714/746 |
| 5,937,374 A | * | 8/1999 | Bartkowiak et al. ........ 704/209 |
| 5,944,851 A | * | 8/1999 | Lee ............................. 714/799 |
| 6,046,784 A | * | 4/2000 | Lee ......................... 375/340.27 |
| 6,188,980 B1 | * | 2/2001 | Thyssen ...................... 704/230 |
| 6,205,130 B1 | * | 3/2001 | DeJaco ........................ 370/335 |
| 6,205,339 B1 | * | 3/2001 | Leung et al. ................ 455/553 |

FOREIGN PATENT DOCUMENTS

| | | | |
|---|---|---|---|
| EP | 0982904 | 3/2000 | |
| JP | 62285541 A | * 12/1987 | ............. G10L/9/00 |
| JP | 8008810 | * 1/1996 | ............. H04B/7/26 |
| WO | 9328947 | 11/1993 | |
| WO | 9632817 | 10/1996 | |
| WO | 9827758 | 6/1998 | |

OTHER PUBLICATIONS

Nakamura, O.; Dobashi, A.; Seki, K.; Kubota, S. and Kato, S.; Improved ADPCM voice transmission for TDMA–TDD systems; 43rd IEEE Vehicular Technology Conference, 1993; pp.: 301–304.*

* cited by examiner

Primary Examiner—Albert DeCady
Assistant Examiner—Joseph D. Torres
(74) Attorney, Agent, or Firm—Philip Wadsworth; Kent D. Baker; Kyong H. Macek (57) ABSTRACT

A method, apparatus, and article of manufacture used to encode/decode a low activity communication signal—such as a Baudot tone—for transmission over a telecommunications system. The telecommunications system may include any number of wireless links. Once the system is noticed that a low activity signal needs to be transmitted, each vocoder used in the system to encode/decode the signal performs a unique encoding/decoding process. In one embodiment, frames containing errors adversely affecting a signal are delivered to the vocoder and the "soft bits" contained therein are used to determine the original signal transmitted. In another embodiment, encoding of the signal may include encoding the signal using redundancy with the encoded signal being spread across multiple vocoder frames.

5 Claims, 4 Drawing Sheets

METHOD AND APPARATUS SUPPORTING TDD/TTY MODULATION OVER VOCODED CHANNELS

BACKGROUND OF THE INVENTION

1. Field of the Invention

Generally, the present invention relates to the field of telecommunication devices for the deaf (TDDs) or text telephone yokes (TTYs). More particularly, the invention relates to modification of standard vocoder operation to enable reliable transport of TDD/TTY signals within a telecommunication system. The system may include wireless links.

2. Description of the Related Art

Many deaf or hearing-impaired people use communication terminals specifically constructed and designed to enable them to communicate over standard telephone lines. Such devices, referred to as telecommunication devices for the deaf (TDDs) or Text Telephone Yokes (TTYs), are collectively referred to as TTDs in this application. Typically, TTDs include a keyboard and a display connected to a telephone via a modem (modulator/demodulator). The modem is built into the TDD and is either directly connected to a telephone line or coupled by an acoustic coupler to a normal telephone handset. TDDs are capable of transmitting information over telephone lines by means of coded tones to other TDDs connected at opposite ends of the telephone line through another modem. These tones are referred to as low activity communications because the frequency and amplitude envelopes remain relatively constant.

The code and protocol that is in widespread conventional use for TDD communications is an idiosyncratic one. The code set, known as Baudot, and the communication protocol (TDD protocol) evolved historically at a time when many telecommunication devices for the deaf were based on mechanical or electromechanical devices rather than electronic devices. Accordingly, the TDD protocol was constructed for a set of constraints that no longer are relevant to present day devices. Those constraints work to create a code protocol and a telecommunication network of users and devices operating under that protocol, that is somewhat antiquated.

Traditionally, TDD communications are conducted at 50 Baud (45.5 Baud in some countries), representing a transfer of 6 characters per sec. Other protocols now available for TDD communications incorporate higher Baud rates, such as the ASCII (American Standard Code Information Interchange) and enhanced Baudot protocols. Regardless, a normal TDD communication character set consists of characters that are 5 bits long. These characters are analogous to a letter in an alphabet where each letter represents a word or idea. A character is grouped with overhead information bits prior to transfer, where each group of bits to be transferred has a duration or unit interval equal to 20 milliseconds. For example, under conventional TDD protocol, a group of bits to be transferred comprises 8 bits: a start bit (one source or zero bit), five bits representing the character, and at least one and ½ bits marking the stop point of the transfer group. This 20 milliseconds interval is also the frame length produced by a vocoder, discussed below, for transmitting one frame of information in a wireless telecommunications system.

Compared to modem telecommunication systems, TDD transmissions occur at a snail's pace. A bigger problem is that TDD signals are substantially constant. These slow paced, monotone signals can create havoc in digital telecommunication systems that transmit higher activity signals at very high rates, and especially in telecommunication systems that include wireless links. One example of such a telecommunication system is a code division multiple access (CDMA) system having a large number of wireless subscriber units. Each subscriber unit has a transceiver and communicates within the system through satellite repeaters or terrestrial stations referred to as cells. Each cell includes a physical plant called a base station. A cell covers a limited geographic area and routes calls carried over subscriber units to and from the telecommunication network via a mobile switching center. When a subscriber moves into the geographic area of a new cell, the routing of that subscriber's call may be eventually made through the new cell by a process called a "handoff."

A subscriber unit, generically referred to as a cell phone, transmits a signal that is received by a base station. The signal is relayed to a mobile switching center that routes the signal to a public switched telephone network (PSTN) including telephone lines or other subscriber units. Similarly, a signal may be transmitted from the PSTN to a subscriber unit via a base station and a mobile switching center.

The interface between the subscriber unit and the base station is referred to as the air interface. The telecommunications industry association (TIA) has provided a standard for CDMA call processing on the air interface entitled "IS-95 Mobile Station—Base Station Compatibility Standard for Dual Mode Wideband Spread Spectrum Cellular System." Addendum to IS-95 are provided as Telecommunications Service Bulletins (TSB). The standard IS-95+ TSB74 includes provisions for service negotiation on the air interface and is incorporated herein by reference.

Service negotiation is critical to successfully transmit any communication, especially a low activity TDD communication, over a digital telecommunication system. One problem with modern systems, including the one described above, is that a vocoder—a device used in the system to encode a voice or TDD analog signal into a digital signal, and to decode a digital signal into a voice or TDD analog signal—has difficulty in handling the substantially monotone signal and slow speed dictated by the TDD protocol. In current systems, a low activity communication signal such as a TDD communication would probably be treated by the vocoder as background noise or signal interference and be disregarded.

What is needed is an invention that can easily be integrated into existing communication systems and that does not require an increase in transmission power to reduce frame error rates. The invention should be able to sense when a low activity communication is received, or notice should be sent to the system, and be able to reconstruct frames containing errors by reviewing adjacent frames. Alternatively, the invention should be capable of reducing frame error rates by invoking a protocol to be used by the vocoders during transmission of the low activity communication signal.

The invention should be compatible with wireless telecommunication modulation systems, such as CDMA systems, servicing large numbers of system users. A more robust discussion of CDMA systems and techniques used in multiple access communication systems may be found in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein. Further, the invention should also be compatible with other modulation systems and techniques used in other types of communication systems, such as time division multiple access (TDMA), frequency division multiple access (FDMA), and amplitude modulation (AMPS) schemes.

SUMMARY OF THE INVENTION

Broadly, the present invention involves the modulation of a low activity communication by a telecommunication system using encoded signals. More particularly, the invention concerns a method, article of manufacture, and apparatus that uses specialized encoding, decoding, or both, on a low activity communication signal to minimize a transmitted signal's frame erasure rate without increasing transmission power. The invention also provides for decoding a low activity signal by looking at "soft bits" contained in erred frames, or in frames adjacent to an erred frame, in an attempt to determine the content of the original frame.

Certain disclosed embodiments of the invention provide unique decoding methods for a TDD signal that was encoded using standard encoding protocol. In one embodiment, the decoder may compare a frame containing transmission errors (erred frame) with a vocoded frame from a known TDD signal and determine the most likely vocoded frame that was transmitted. In another embodiment, the decoder may review adjacent frames to determine the most likely vocoded frame that was transmitted but received in error. And although a TDD communication is discussed throughout this application, it should be understood that any slow or low activity communication may be transmitted using this invention.

Another embodiment of the invention provides for decoding as discussed above but invokes vocoder parameters that are different from standard vocoder parameters. When a TDD signal is received, the encoder switches to "Baudot encoding mode," notices the decoder of the protocol change, and uses channel coding redundancy to further improve the decoder's chances of determining the correct TDD signal sent even if it is contained in a bad frame. This version of the invention replaces standard vocoder parameters with vocoder "signatures" that are better spaced apart, thus making it easier to distinguish between tones.

Yet another version of the invention provides for encoding a TDD signal in vocoder frames using redundancy, but doing the encoding across numerous vocoder frames. The information is interleaved across "N" frames so that if a frame is lost, the decoder can extract necessary information from adjacent frames to determine the content of the lost frame.

The invention provides its users with numerous advantages. One advantage is that a TDD message can be transmitted using a digital transmission medium having wireless links. Yet another advantage is that a TDD device can be connected to a mobile device or subscriber's unit, such as a digital cellular telephone, connected to the telecommunications system by a wireless link. The invention also provides a number of other advantages and benefits that should become even more apparent after reviewing the following detailed descriptions of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF SELECTED EMBODIMENTS

FIGS. 1 through 4 illustrate examples of various method and apparatus aspects of the present invention. For ease of explanation, but without any limitation intended, these examples are described in the context of a TDD communication device attached to a digital telecommunication system incorporating wireless links, one example of which is described below.

HARDWARE COMPONENTS AND INTERCONNECTIONS

Figures 1A, 1B:
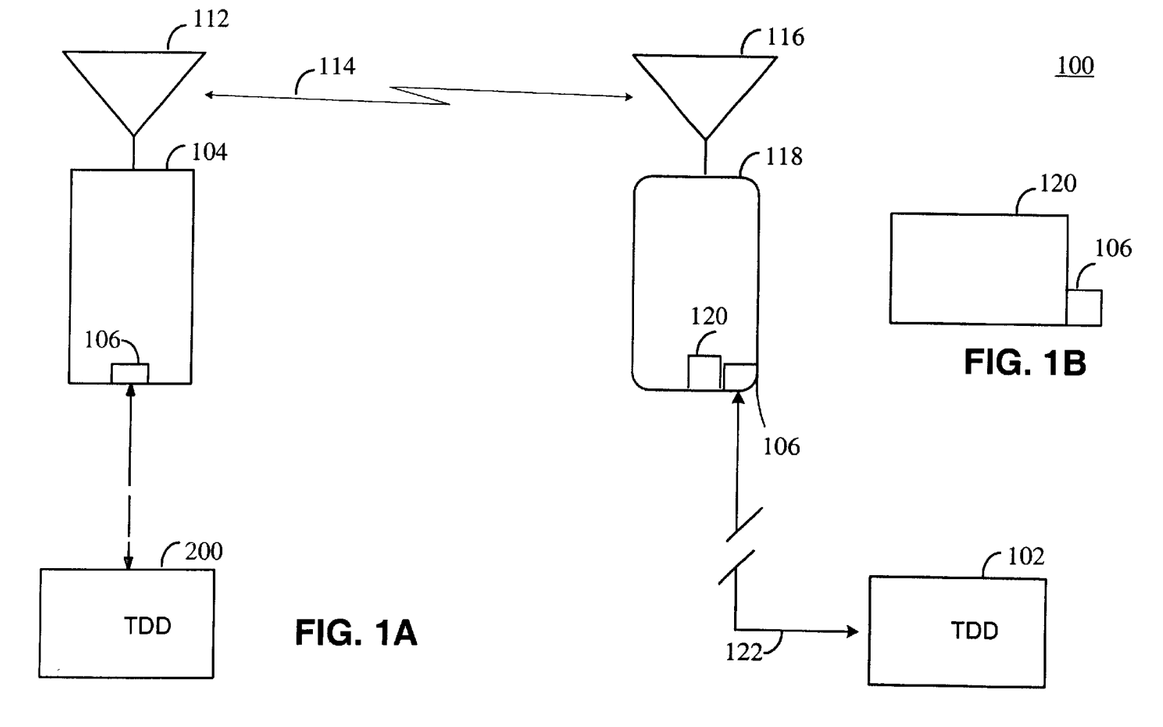
FIG. 1A is a block diagram of hardware components and interconnections of a telecommunications system incorporating wireless links in accordance with one embodiment of the invention.
FIG. 1B is a block diagram of a vocoder capable of implementing the present inventions encoding and decoding methods coupled to a prior art noticing apparatus in accordance with one embodiment of the invention.

FIG. 1A and FIG. 1B illustrate one type of telecommunications system 100 including wireless links and a TDD communication device (TDD) 200 as used in the present invention. As shown in detail in FIG. 2, TDDs usually include a keyboard and a display that are connected to a telephone via a modem (modulator/demodulator). The modem is built into the TDD and is either directly connected to a telephone line or coupled by an acoustic coupler to a normal telephone handset. TDDs are capable of transmitting information over telephone lines by means of coded tones to other TDDs, such as TDD 102 shown in FIG. 1A, connected at opposite ends of a telephone line through another modem.

In digital telecommunications systems using wireless links, the TDD 200 may be coupled to a subscriber unit 104 that Is used in the telecommunications system 100 to transmit received signals. Exemplary embodiments of a subscriber unit 104 are digital signal telephones, such as the Q-800 manufactured by QUALCOMM, Incorporated, and commonly referred to as cell phones. The subscribers unit 104 as shown in FIG. 1A includes a noticing apparatus 106 communicatively coupled to circuitry of the subscribers unit 104. A hardware 108 may be used to connect the TDD 200 to the subscribers unit 104 via the noticing apparatus 106, or a device port may be used. Examples of such a noticing apparatus and device ports are disclosed in the U.S. Pat. No. 6,205,339 entitled "METHOD AND APPARATUS FOR ESTABLISHING TDD/TTY SERVICE OVER VOCODED CHANNELS," issued Mar. 20, 2001, assigned to the assignee of the present invention and incorporated by reference herein.

The device port may be configured to receive a low activity communication device attachment such as a plug, connector, or receiver. These items are commonly used today for connecting telephone and computer equipment, and are readily available from electronics suppliers. The device port interfaces with the attachment to communicatively connect a low activity communication device (not shown) such as the TDD 200 to the subscriber unit 104 of the telecommunications system 100. The device port allows information to be exchanged between a low activity communication device and the subscriber unit 104. Regardless of whether a device port or a hardwire is used, the noticing apparatus 106 allows for the system 100 to be noticed that a TDD signal needs to be transmitted.

Returning to FIG. 1A, after the noticing apparatus 106 receives the low activity communication signal, the signal is processed by the subscriber unit 104. Very basically, a signal for transmission is created that includes the information contained in the low activity signal. Because the telecommunications system 100 has been noticed that a low activity signal is being transmitted, the system adapts to assure a decipherable transmission occurs. For example, an analog signal received from the analog circuitry 228 shown in FIG. 2 normally would undergo signal or "voice" processing including digitizing the signal, setting a transmit power level to protect against signal fading during transmission, compressing the signal, and filtering. These functions may be performed by the circuitry (not shown) of the subscriber unit 104 that includes a vocoder. Depending upon the signal received, a variable rate vocoder—generically referred to in this application as a vocoder—may dynamically determine and negotiate service within the telecommunications system 100 to provide successful transmission and decoding of the signal. This negotiation involves establishing the values for multiple parameters, such as the rate the vocoder should use, the transmission power, and compression technique. A fuller discussion concerning the processing of signals for transmission in telecommunication system may be found in the Electronic Industry Association standard TIA/EIA/IS-95-A entitled "Mobile Station-Based Station Compatibility Standard for Dual-Mode Wideband Spread Spectrum Cellular Systems, referred to as "IS-95" and incorporated by reference herein, and other transmission standards, including standard vocoder protocol, are well known in the art.

However, when a low activity signal is received, a vocoder may identify the signal as either noise, a pause, or a signal not intended to be transmitted. Simply, a vocoder doesn't know what service to use because it cannot identify the low activity signal received. By noticing the system 100 that a low activity signal is being sent, the vocoder will establish the service needed to assure the best possible transmission and decoding of the signal.

After the low activity communication signal has been processed and the service determined, a signal may be transmitted using an antenna 112 over a wireless link 114. The digitized signal is received by another antenna 116 at a remote location, such as a base station 118, and processed by base station circuitry (not shown) including a vocoder 120. Various based station circuitry arrangements for telecommunications systems are well known in the art, and a further understanding may be found in TIA/EIA/IS-95-A referenced above. By processing the signal after receipt, a low activity signal reflecting the information contained in the transmitted low activity signal may be delivered to the low activity device 102 via communication link 122. A second noticing apparatus 106 is shown coupled to the base station 118. This provides for a low activity signal to be sent from the low activity communication device 102 back to the TDD communication device 200.

Communication link 122 appears bifurcated to emphasize that the base station 118 may not be connected directly to the low activity device 102. The base station 118 is usually connected to a standard PSTN switching station commonly used by telephone companies for coordination of telephone calls and the low activity device 102 is connected to the PSTN. In another embodiment, a second mobile station (not shown) connected to the low activity communication device 102 may be linked to the base station 118. Further, the telecommunication system may include mobile switching stations as mentioned above.

Figure 2:
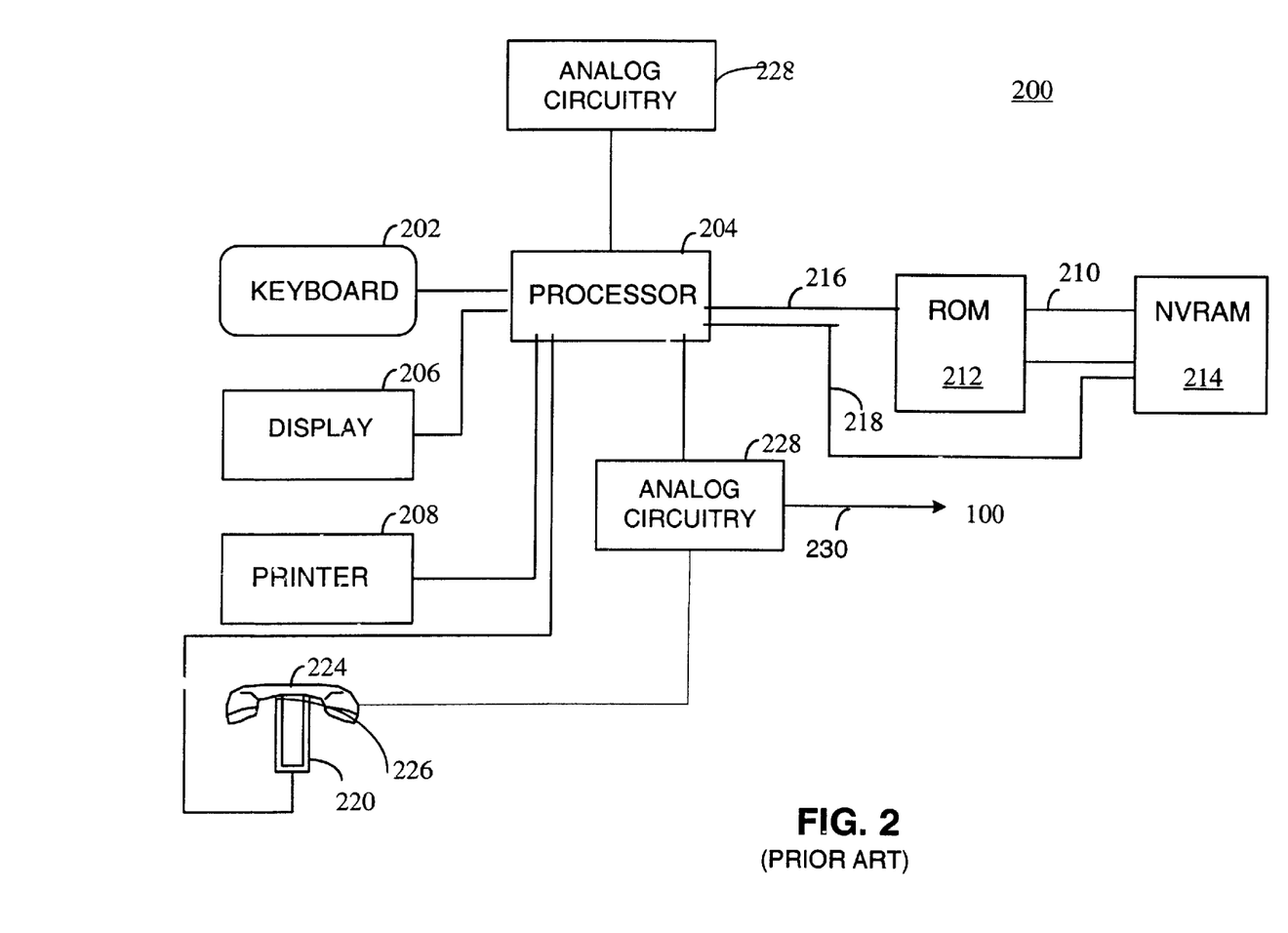
FIG. 2 illustrates a typical prior art TDD communication device used in accordance with one embodiment of the invention.

Shown in FIG. 2 is a schematic block diagram of the circuitry of a typical TDD device 200, either a standard or enhanced TDD, operating in accordance with the present invention. In the TDD device 200 of FIG. 2, a keyboard 202 is provided into which the user may input data characters. The output of the keyboard 202 is connected to a processor 204 that serves to control the circuit elements contained in FIG. 2. Characters that are received or transmitted by the processor 204 are also displayed on a display 206. Optionally, the same characters received or transmitted may be reproduced on a device such as printer 208. Some TDD devices may not have a printer, although it is standard for TDDs to have a visual display of some kind so that a user can see the characters being typed and received. The keyboard 202 thus functions as an input source of data characters to the processor 204 while either or both the display 206 and the printer 208 serve as local destinations for the data stream characters.

The processor 204 may be connected by a suitable data and address bus that would typically be used for this type of application by one schooled in the art. In FIG. 2, the bus 210 connects a read only memory (ROM) 212 to a non-volatile random access memory (NVRAM) 214. Appropriate control lines 216 and 218 are connected from the processor 204 to the ROM 212 and the NVRAM 214 providing interactive control of these units. The ROM 212 is intended to permanently store the program that dictates the operation of the processor 204 as well as certain data used by the program. For example, special character strings for machine-to-machine communication and for synchronizing two TDDs in an enhanced operating mode may be stored. The NVRAM 214 is used as a buffer, a floating storage place for data coming into or out of the TDD device 200, and for storage of standard messages as entered by the user through the keyboard 202 and intended for rapid access. Other circuitry configurations may be used, such as combining the microprocessor 204 with the ROM 212 and the NVRAM 214 in a single integrated circuit.

Also connected to the processor 204 in FIG. 2 is a telephone keypad 220 that permits the entry of telephone numbers for dialing by the processor 204 through telecommunications system 100. A standard telephone handset 224 rests on a cradle 226 that incorporates a switch (not shown) indicating whether the handset 224 is in use and thus removed from the cradle 226.

The processor 204 is communicatively connected through analog circuitry 228 to the telecommunications system 100. This connection is shown as a hardwire connection 230, but may be any type of connection that can communicatively link the analog circuitry 228 with the telecommunications system 100. The analog circuitry 228 provides a connection between the handset and the processor 204 allowing both Baudot tones and dialing tones to be received by the telecommunications system 100. The analog circuitry 228 provides an interface of voice information to and from the handset 224. The analog circuitry 228 of the TDD device 200 is connected to the telecommunication system 100 using a connector such as the device discussed above.

Despite the specific foregoing descriptions, ordinarily skilled artisans having the benefit of this disclosure will recognize that the apparatus discussed above may be implemented in a telecommunications system of different construction without departing from the scope of the present invention. As a specific example, multiple subscriber unit 104 may be linked to the base station 118, or the low activity communication device 200 may be integrated with the subscriber unit 104.

OPERATION

After a TDD signal is received, vocoders used by the system 100 during processing of the signal are noticed or detect that a low activity signal has been received for transmission and may use an eighth rate traffic channel frame format to transmit the signal. However, adaptation of the following methods for quarter-to-full rate traffic channel transmissions may be accomplished, although an undesirable increase in transmission power will result.

Figure 3:
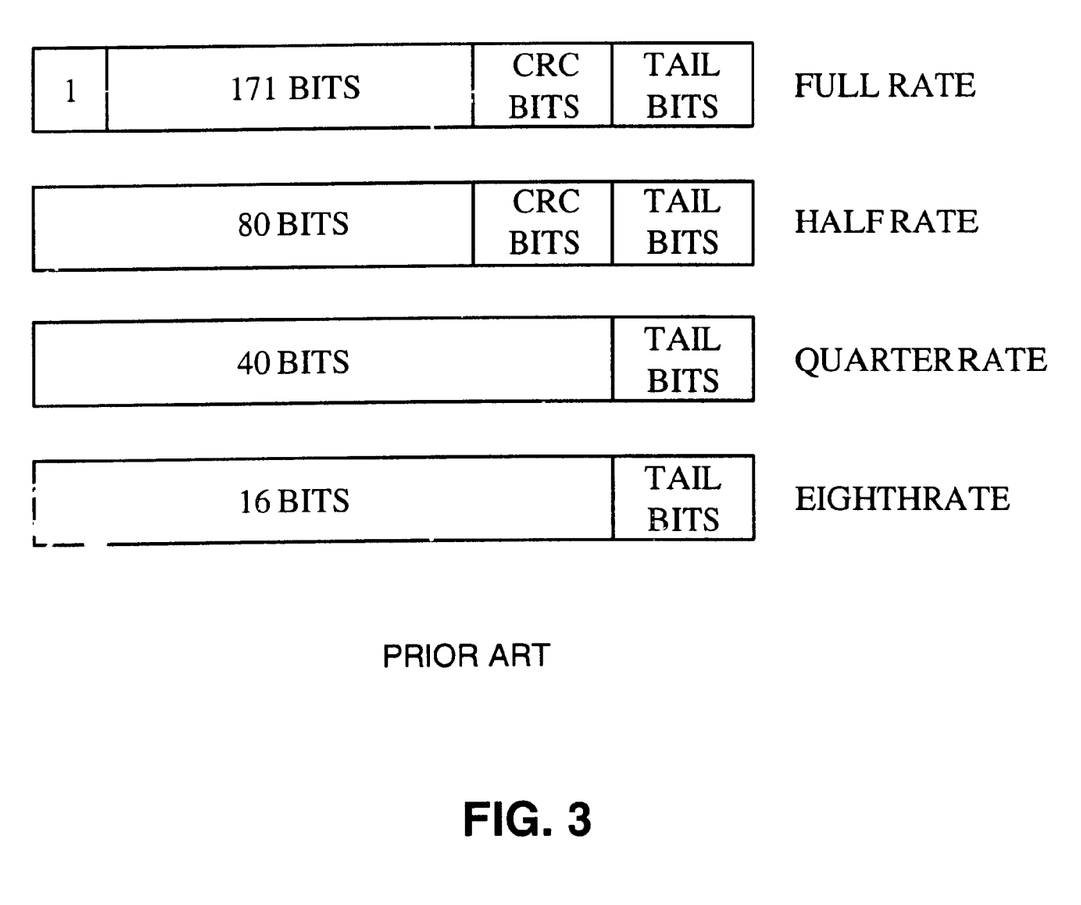
FIG. 3 shows a traffic channel frame format for a rate set 1 used by a variable rate vocoder.

FIG. 3 shows a typical variable rate vocoder frame format for a traffic channel using a rate set 1. The variable rate vocoder produces a frame every 20 milliseconds using Code Excited Linear Prediction (CELP) techniques that are well known in the art. The frames may be formatted in full, half, quarter or eighth rate formats depending upon voice activity. If a Baudot tone is received, the variable rate vocoder will usually detect low activity and use the eighth rate format, assuming the standard vocoder currently in use can detect that a signal is being sent. Commonly, a Baudot signal will be treated as noise and generally ignored.

Full rate refers to the fact that each bit contained in each frame is not repeated. Half-rate refers to sending the same number of bits per frame, but each bit is repeated once in the frame; that is, each unique bit will appear twice in the frame. Quarter-rate refers to each unique bit appearing four times per frame, and so on. The more repetitively a bit of information is sent, the less total information is sent per frame. At full rate the signal is sent at a higher power because a given bit is sent only once. This full rate power level is referred to as the reference power for purposes of this application. Because bits are repeated at lower rates, a reduced power level is used because the power for each repeated bit is accumulated over the frame. Assuming a fixed minimum power is used for the transmission, a full rate transmission will contain more frame errors than would a half rate transmission of the same information.

Typically, the power level is set based upon a selected frame error rate (FER) for the transmitted signal as received at a remote location, also referred to as the target of the transmitted signal, such as the subscriber unit. A desired FER is selected because when a low activity signal is being sent, the actual PER increases using current methods. This selected FER range is between a 0.1% and a 1.0% error rate, but may be greater or lesser if necessary for preservation of the quality of the transmitted signal. Preferably, an FER of 0.2% is desirable for low activity signals.

In the present invention, implementing specialized encoding and decoding techniques controls the frame error rate. In the exceptional circumstance that the disclosed techniques fall short of a desired FER—in this case FER being defined as the total number of erred frames even after reconstruction of vocoder frame information, as discussed below, has been attempted—transmission power could also be increased. It should be realized that any increase required would still be less than the increase required if the present encoding/decoding techniques were not implemented.

A. Decoder Using Soft Bits

In one embodiment, when a TDD call is received, the system 100 is either noticed or detects the call type. The system 100 processes the call from TDD unit 200 for transmission using standard processing techniques known in the art. When the frame is received at a remote point, for example base station 118, the call is decoded using the present invention. If a frame error has occurred in the physical layer, that is, if the frame does not pass the checksum as described within IS-95, the frame is still delivered to the vocoder 120 for decoding. Delivering the erred frame to the vocoder is currently not done in standard IS-95 implementations. Bits contained in an erred frame are referred to as "soft bits" because they may not all be in error and information may be gleaned from them individually to reconstruct information contained in erred frames.

However, detecting or being noticed that a TDD call has been received, the vocoder decoder in the present invention processes erred frames by looking at the vocoder parameters received and comparing these parameters against "signatures" of TDD modulation signals or tones as seen in the vocoder parameter space. This compares the vocoder parameters of stored vocoded TDD tones with those received. This comparison results in a determination being made as to which TDD signal was most likely received.

For example, suppose a vocoder representation of a Baudot tone of "0" is represented as sixteen "0"s in sequence, and that the representation of a Baudot tone of "1" is represented as sixteen "1"s. The present method considers these to be voice-parameter-space signatures. For the following examples, three layers are identified as:

| | |
|---|---|
| vocoder frame boundaries: | \|--voc frame 'N'--\| |
| baudot tone boundaries: | \|--baudot 'X'--\|, and |
| received vocoder parameter: | 0000000000000000 or 1111111111111111. |

Assume that the vocoder decoder receives the following parameters:

```
                              {erred frame}
|--voc frame 1--|--voc frame 2--|--voc frame 3--|--voc frame 4--|--voc
t '1'--|--baudot '0'--|--baudot '0'--|--baudot '1'--|--baudot '0'--|
1111111100000000000000000000000000000000110000111111111100000000000000000
                                  ^^^^^
                              [frame errors]
```

The decoder recognizes the baudot tone boundaries and recognizes that the received parameters for the second baudot '0' are closer to '0' than '1.' The decoder decides on baudot tone '0' and modifies the suspected error bits before decoding. For the next baudot tone '1,' the decoder recognizes that the vocoder parameters are closer to '1' than '0' and modifies the bits accordingly. The decoder now uses the following sequence to produce a corrected TDD signal:

```
                              {corrected frame}
| --voc frame 1-- | --voc frame 2-- | --voc frame 3-- | --voc frame 4-- | --voc
t '1'-- | --baudot '0'-- | --baudot '0'-- | --baudot '1'-- | --baudot '0'-- |
1111111100000000000000000000000000000011111111111111110000000000000000
```

This example shows the error transitions to occur at a frame boundary, which isn't always the case. If these transitions commonly fall within a frame, another version of the invention can be used as follows.

If the vocoder decoder receives an erred frame where the erred bits are contained within the frame, the vocoder may look to adjacent non-erred or "good" frames to reconstruct the erred frame. The adjacent frame will contain a portion of the baudot tone that was lost in the erred frame. For example, suppose the following signal is received:

```
                               {erred frame}
| --voc frame 1-- | --voc frame 2-- | --voc frame 3-- | --voc frame 4-- | --voc
t '1'-- | --baudot '0'-- | --baudot '0'-- | --baudot '1'-- | --baudot '0'-- |
1111111100000000001111111111100000000001111111111111110000000000000000
                                ^^^^^^^^^^
                               [frame errors]
```

The vocoder parameters for the second baudot tone '0' are too ambiguous to make an accurate decision on the tone because the number of '0's is almost the same as the number of '1's in the vocoder frame parameters. To make a better determination, the vocoder looks at the next adjacent frame (voc frame 3) and determines that the tone appears to continue as a '0' into this frame. The decoder therefore decides that this is meant to be a baudot '0' tone in the latter half of vocoder frame 2.

Figure 4:
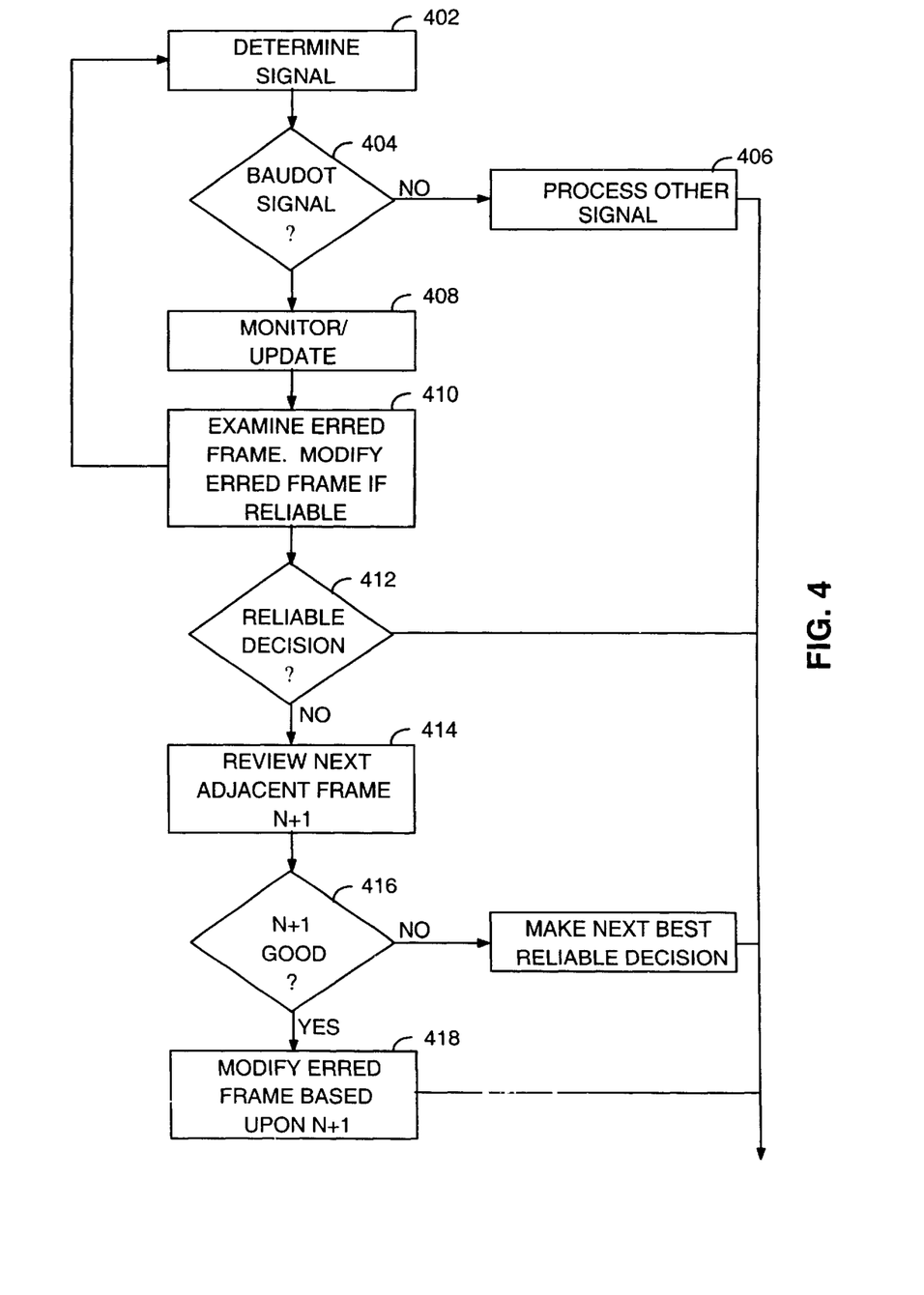
FIG. 4 is a flow diagram of one method aspect in accordance with the invention.

As shown in the flow chart of FIG. 4, after it is determined if a low activity signal is being received in tasks 402 and 404, the decoder continuously monitors and updates the received baudot tone boundaries in task 408. Otherwise as in task 406, any non-low activity signal is processed using traditional methods. If an erred frame is received as detected in the physical layer, the frame is assigned an indicator N and the vocoder examines the erred frame in task 410. If a "reliable" decision concerning whether or not the frame is a baudot '0' or '1' can be made, such as when the frame parameters are quite distinct, then the erred frame is modified to reflect the parameters of the decision. A reliable decision is one that falls within a prescribed probability of obtaining the original frame parameters. For purposes of this invention, the desired probability would be in the range of 51% to certainty. If a modification is made, the method returns to task 402 and determines the next signal.

If a reliable decision cannot be made as shown in task 412, the vocoder reviews the next adjacent frame N+1 or, alternatively, N−1, at task 414. If this frame is good in task 416, the decision to modify the erred frame is made in task 418 based upon the parameters contained within frame N+1, or alternatively, frame N−1. if neither next adjacent frame is good, then a next best reliable decision is made based upon the parameters contained within next adjacent frame N+1 and frame N's parameters are modified accordingly.

B. Encoder and Decoder Using Soft Bits

The decoder implementation in this embodiment of the invention is similar to that disclosed above. However, to further reduce the error rate and improve upon the accuracy and reliability of the signal decoded, the encoder also takes advantage of the "soft bits."

When the vocoder encoder detects baudot tones are to be sent, the encoder switches to a "baudot tone encoding mode." In this mode the encoder decides whether the tone received for encoding is a '0' or a '1.' The encoder then sends this decision to the decoder using a vocoder frame, but using channel-coding redundancy to improve the decoder's chances of determining the proper baudot tone. Even if the decoder receives a tone in an erred frame, it will have a greater likelihood of determining the correct tone sent because of the forwarded decision.

In a simplified example, if the encoder detects a baudot '1' is to be transmitted, it sends a series of is to the decoder. The series may be any length, but must be sufficient so that the decoder can operate as discussed above in section A if necessary. This version of the invention replaces the standard vocoder parameters with vocoder "signatures" that are better spaced apart, thus making it easier to decide between two tones.

C. Encoder and Decoder Not Using Soft Bits

This embodiment of the invention is another version of the methods described in sections A and B, but the decoder is not given the soft bits from any erred vocoder frames to process.

In this case, when the vocoder encoder detects a '1' or '0' baudot tone, the vocoder also encodes the tone in a vocoder frame using redundancy, but the encoding may be done across many vocoder frames. The '1's and '0's are interleaved across a number of frames M so that if one frame is lost, the decoder can extract the necessary information from adjacent frames. The following example shows interleaving taking place across four frames, but any number of frames could be used. Assume the encoder detects the following baudot tones for transmission:

```
                    11001
```

The encoder encodes the frames as follows for transmission to the decoder:

| --voc frame 1-- | --voc frame 2-- | --voc frame 3-- | --voc frame 4-- | --voc frame 5 |
| --baudot '1'-- | --baudot '1'-- | --baudot '0'-- | --baudot '0'-- | --baudot '1'-- |
xxxxxxxxxxxx1111xxxxxxxx11111111xxxx1111111100001111111100000000111100000001111.

In this example, the vocoder frame parameters for each frame are segmented where four bits represents the detected baudot tone in a particular vocoder frame. The entire sixteen bits represents the detected baudot tones from the last four vocoder frames:

| baudot for frame N-3 | baudot for frame N-2 | baudot for frame N-1 | baudot for frame N |.

To account for baudot tones not corresponding to vocoder frame boundaries, the invention uses the following four-bit sequence where XXYY indicates that the code in the current vocoder frame reflects a baudot code of 'X' followed by a baudot code of 'Y':

| --voc frame 1-- | --voc frame 2-- | --voc frame 3-- | --voc frame 4-- | --voc
'0'-- | --baudot '1'-- | --baudot '1'-- | --baudot '0'-- | --baudot '0'-- |
xxxxxxxxxxxx0011xxxxxxxx00111111xxxx1111111110011111111000000001111

OTHER EMBODIMENTS

While there have been shown what are presently considered to be preferred embodiments of the invention, it will be apparent to those skilled in the art that various changes and modifications can be made without departing from the scope of the invention as defined by the appended claims.

What is claimed is:

1. A method for communicating a noticed low activity communication signal in a telecommunications system, the telecommunication system including vocoders, the method comprising:
    replacing standard vocoder encoding/decoding parameters used by said vocoders with vocoder signatures, wherein sequenced bits contained within said vocoder signatures are spaced further apart than sequenced bits contained within standard vocoder parameters, said replacing comprising:
        communicating to a second vocoder that a low activity communication signal is being transmitted;
        encoding said low activity communication signal with said second vocoder, said second vocoder determining if a bit is a 0 or a 1, said encoding performed using channel coding redundancy within an information bit field of said original frame to improve said first vocoder's likelihood of decoding said original message, said encoding also noticing said first vocoder that a low activity signal is being transmitted; and
    transmitting said encoded low activity communication signal as an original frame containing original information represented by sequence bits to a first vocoder;
    receiving an erred frame at a target destination, said erred frame comprising bits, said bits sequenced substantially the same as said bit sequence of said frame;
    delivering said erred frame to a first vocoder at the target destination; and
    processing said erred frame with said first vocoder to obtain additional information used to identify said original information contained in said original frame.

2. The method recited in claim 1, processing of said erred frame comprising:
    comparing said erred frame bit sequence with a known low activity communication signal bit sequence; and
    modifying said erred frame bit sequence based upon said comparison to identify said original information.

3. The method recited in claim 1, wherein said erred frame is labeled N and processing of said erred frame comprises:
    comparing said erred frame N bit sequence with a known low activity
    communication signal bit sequence;
    if said comparison results are statistically reliable:
        modifying said erred frame N bit sequence based upon said comparison to reflect said known low activity communication signal bit sequence;
    but if said comparison results are not statistically reliable:
        processing a frame N+1 neighboring said erred frame N to determine if frame N+1 contains any errors;
        if said N+1 frame is errorless:
            determining a low activity communication signal defined by a bit sequence contained in frame N+1; and
            modifying said erred frame N bit sequence based upon said bit sequence contained in frame N+1 to identify said original information.

4. The method recited in claim 3, wherein said comparison results are statistically reliable if the probability that said known low activity communication signal bit sequence will reflect the bit sequence of said original message is 60% or greater.

5. The method recited in claim 3, wherein said comparison results are statistically reliable if the probability that said known low activity communication signal bit sequence will reflect the bit sequence of said original message is between 70% and certainty.

* * * * *